S. L. BOYLES.
TETHERS.
No. 174,407.
Patented March 7, 1876.
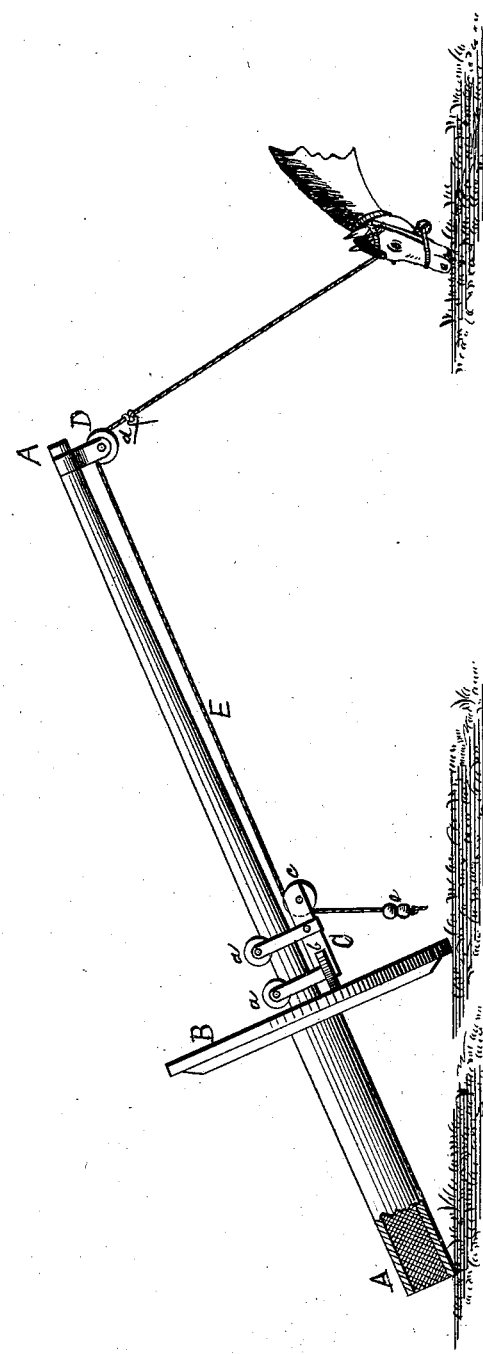
Attest:
G. M. Walker
George N. Davis
Inventor:
S. L. Boyles.

UNITED STATES PATENT OFFICE.

SAMUEL L. BOYLES, OF SPRING GROVE, WISCONSIN.

IMPROVEMENT IN TETHERS.

Specification forming part of Letters Patent No. 174,407, dated March 7, 1876; application filed October 12, 1875.

*To all whom it may concern:*

Be it known that I, SAMUEL L. BOYLES, of Spring Grove, State of Wisconsin, have invented a Tether, of which the following is a specification:

The object of my invention is to confine an animal to pasture, as illustrated in the annexed drawing, in which—

A A represent a pole, which may be made of any convenient length, but which is made heavier at one end than at the other, in order that the heavy end may overbalance the light end when the pole is fastened in the center of a fulcrum-wheel, B, at such point as will permit the heavy end to overbalance the light end of the pole considerably. C is a small truck or carriage suspended from pulleys $a\ a$, and provided with a pulley, $b$, to ease the friction on the wheel B, and also provided with a pulley, $c$, to carry the rope, as shown in the drawing. This carriage will, by its own weight, always remain suspended from the pole A A, and can also move up and down on the pole A A, the friction being eased by the small pulleys $a\ a$. D is a pulley, also suspended from the pole A A at its upper end, and is hung by a clip loosely, so that it may at all times remain suspended from the pole, but is not intended to slide up or down the pole. E is a rope, to which the animal may be hitched, and is provided with a stop, $d$, and also with a weight, $e$, and passes over the pulley D and the small pulley $c$ of the carriage C.

It will be seen that as the animal grazes away from the tether the rope may follow him until the weight $e$ strikes the carriage C, and after that the carriage C may ascend the pole until it strikes the pulley D, thus allowing the animal to have more range of pasture than would be furnished by the rope itself if fastened to a picket, and then, as the animal nears the tether, the carriage will descend the pole and take up the slack of the rope until the stop $d$ strikes the pulley D.

The movements of the animal while grazing will also turn the wheel B, and thus the animal will not be confined to one spot, as if hitched to a picket, and the rope, by being kept off the ground, will wear longer, and also prevent frequent entanglements of the animal with the rope.

I claim as my invention—

The pole A, provided with wheel B, in combination with the carriage C, pulley D, and rope E, arranged to operate substantially as described.

S. L. BOYLES.

Witnesses:
   G. M. WALKER,
   GEORGE W. DAVIS.